United States Patent
Pierfelice et al.

(10) Patent No.: US 9,116,782 B2
(45) Date of Patent: Aug. 25, 2015

(54) VEHICLE AUXILIARY SYSTEM WITH GLOBAL POSITIONING SYSTEM CONTROL

(71) Applicant: Toyota Motor Engineering & Manufacturing North America, Inc., Erlanger, KY (US)

(72) Inventors: Jeffrey E. Pierfelice, Canton, MI (US); Mark A. Jotanovic, Troy, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 218 days.

(21) Appl. No.: 13/653,729

(22) Filed: Oct. 17, 2012

(65) Prior Publication Data

US 2014/0107889 A1    Apr. 17, 2014

(51) Int. Cl.
*B60C 23/00*    (2006.01)
*B60W 40/06*    (2012.01)
*G06F 17/00*    (2006.01)
*G01C 21/00*    (2006.01)

(52) U.S. Cl.
CPC .............. *G06F 17/00* (2013.01); *B60C 23/002* (2013.01); *B60W 40/06* (2013.01); *G01C 21/005* (2013.01)

(58) Field of Classification Search
CPC ...... B60C 23/00; B60C 23/001; B60C 23/002
USPC .............................................. 701/36, 38, 533
See application file for complete search history.

(56) References Cited

U.S. PATENT DOCUMENTS

| | | | |
|---|---|---|---|
| 2008/0243336 A1* | 10/2008 | Fitzgibbons | 701/38 |
| 2009/0143937 A1* | 6/2009 | Craig | 701/37 |
| 2010/0332116 A1* | 12/2010 | Sakashita | 701/201 |
| 2011/0202229 A1 | 8/2011 | Owens et al. | |
| 2012/0203424 A1* | 8/2012 | Filev et al. | 701/36 |

* cited by examiner

*Primary Examiner* — Fadey Jabr
*Assistant Examiner* — Aaron L Troost
(74) *Attorney, Agent, or Firm* — Christopher G. Darrow; Darrow Mustafa PC

(57) ABSTRACT

A system for a vehicle includes a vehicle support subsystem in communication with the GPS subsystem, the vehicle support subsystem operable in response to the GPS subsystem. The system can control a vehicle characteristic (e.g., tire inflation pressure, suspension system, suspension damping system, ride height adjustment system) based at least in part on terrain obtained from a global positioning system (GPS), current weather information, and/or historical weather information.

5 Claims, 4 Drawing Sheets

VEHICLE AUXILIARY SYSTEM WITH GLOBAL POSITIONING SYSTEM CONTROL

BACKGROUND

The present disclosure relates to a vehicle, and more particularly to an auxiliary system therefor.

Tire pressure control systems with Variable Tire Pressure (VTP) technology, also known as Central Tire Inflation (CTI) is often utilized in military and construction vehicles. More recently, tire pressure control systems are being adapted to civilian passenger cars and sport utility vehicles to increase driving comfort.

SUMMARY

A system for a vehicle according to one disclosed non-limiting embodiment includes a vehicle support subsystem in communication with the GPS subsystem, the vehicle support subsystem operable in response to the GPS subsystem.

A system for a vehicle according to another disclosed non-limiting embodiment includes a tire inflation subsystem in communication with the GPS subsystem, the tire inflation subsystem operable in response to the GPS subsystem.

A method of operating a system for a vehicle according to another disclosed non-limiting embodiment includes identifying a vehicle location with respect to a terrain condition and operating a vehicle support subsystem with respect to the vehicle location.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
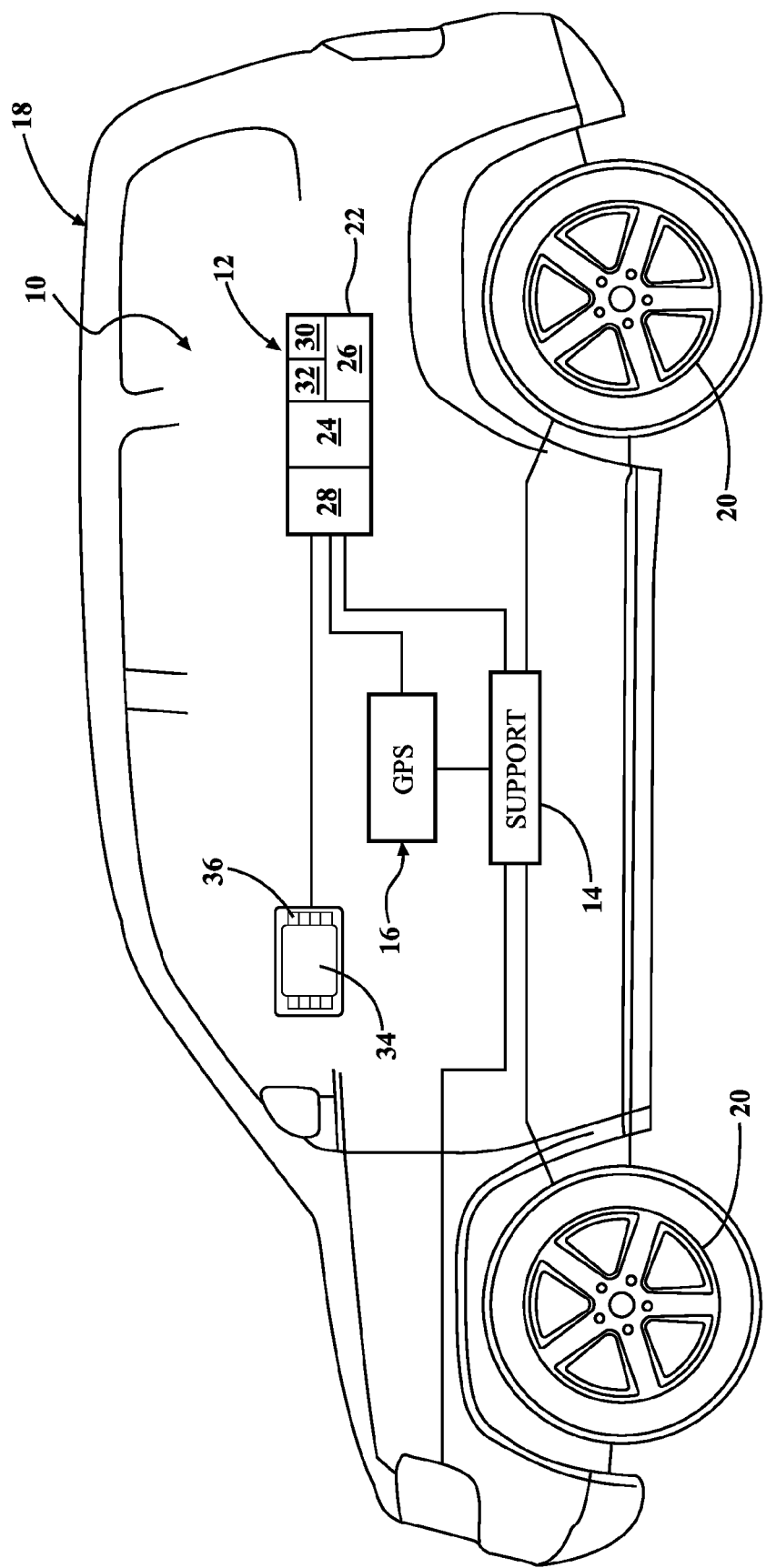
FIG. 1 is a schematic view of a vehicle with an auxiliary system.

FIG. 1 schematically illustrates selected portions of an auxiliary system 10. The auxiliary system 10 generally includes a control subsystem 12, a vehicle support subsystem 14 such as a tire pressure control subsystem and a Global Positioning System (GPS) subsystem 16. The auxiliary system 10 may be utilized within a ground vehicle 18 with four tires 20, however, other vehicles such as tactical wheeled vehicles, farm vehicles, construction vehicles and other vehicle types will also benefit herefrom. Although a tire pressure control subsystem is illustrated in the disclosed, non-limiting embodiment, it should be understood that other vehicle auxiliary subsystems such as, but not limited to, a suspension system, a suspension damping system, a braking system, a drive train system, a stability control system, a torque management system, a ride height adjustment system, a transmission system, a traction control system, and the like.

Figure 2:
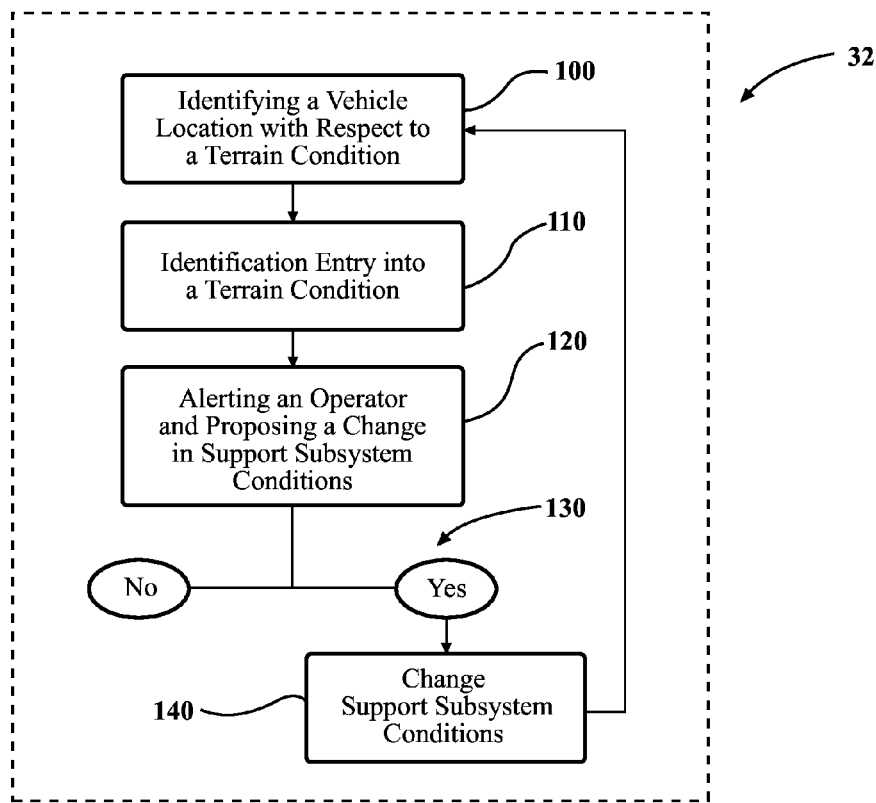
FIG. 2 is a schematic block diagram of an algorithm for operation of the auxiliary system according to one non-limiting embodiment.
Figure 3:
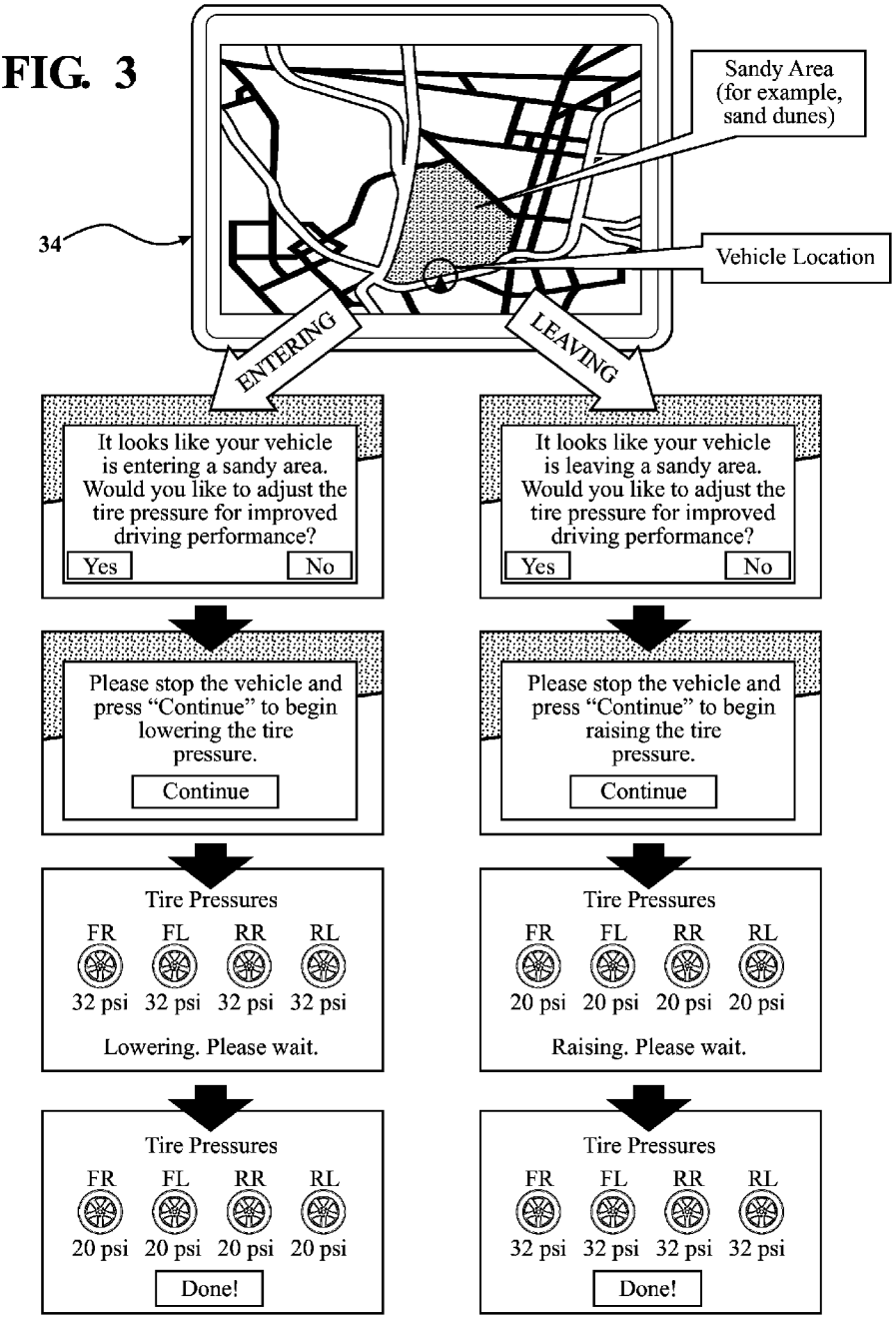
FIG. 3 is a series of pages displayed on a vehicle display in accordance with the schematic block diagram of FIG. 2.

The control subsystem 12 generally includes a control module 22 with a processor 24, a memory 26, and an interface 28. The processor 24 may be any type of microprocessor having desired performance characteristics. The memory 26 may include any type of computer readable medium which stores the data and control algorithms described herein such as a terrain database 30, and a GPS enabled support system algorithm 32 (FIGS. 2 and 3). The functions of the algorithm 32 are disclosed in terms of functional block diagrams, and it should be understood by those skilled in the art with the benefit of this disclosure that these functions may be enacted in either dedicated hardware circuitry or programmed software routines capable of execution in a microprocessor based electronics control embodiment. In one non-limiting embodiment, the control module 22 may be a portion of a central vehicle control, a stand-alone unit or other system. Other operational software for the processing module may also be stored in memory device. The interface 28 facilitates communication with other subsystems such as a display 34, a user interface 36, the vehicle support subsystem 14 and the GPS subsystem 16. It should be understood that the interface 28 may also include communication with sensor systems such as vehicle weight sensors and other data inputs such as weather information.

The terrain database 30 may be stored in the memory 26 in addition to conventional GPS databases which include roads, trails, bodies of water, points of interest, etc., also includes in the disclosed non-limiting embodiment, terrain conditions and the location thereof. Terrain conditions as described herein may include the types of terrain, e.g., sand, swamp, soil, rocks, etc. The terrain database 30 may also include terrain mechanics such as density, depth etc. The terrain database 30 may also be pertinent and calibrated with respect to particulars of the vehicle support subsystem 14 such as tire pressure for particular types of terrain as it is usually desirable to lower tire pressure for lower density terrain, e.g., low pressure for sand and high pressure for pavement.

With reference to FIGS. 2 and 3, operation of the auxiliary system 10 according to one disclosed non-limiting embodiment, generally includes identifying a vehicle location with respect to a terrain condition (step 100). That is, the GPS subsystem 16 compares the vehicle position to the terrain database 30 to determine the vehicle's position relative the types of terrain stored in the terrain database 30. It should be appreciated that the GPS subsystem provides typical display options and that the terrain database 30 may, for example, be overlaid thereon. The terrain database 30 may alternatively or additionally receive information regarding terrain conditions from external sources as well as being pre-programmed therewith.

When the vehicle position is identified as directed toward a change in terrain condition, the auxiliary system 10 identifies the potential entry (Step 110) then alerts the operator and requests change to the vehicle support subsystem 14 (Step 120). The algorithm 32 may utilize a recursive algorithm to determine if the vehicle will enter a new terrain zone should the vehicle continue on its present velocity vector. It should be understood that various tolerances and control procedures may be provided to avoid unnecessary alerts.

If the operator affirms the desire to change the vehicle support subsystem 14 (Step 130), the auxiliary system 10 then provide the required instruction on the display 34. The auxiliary system 10 then changes the condition of the vehicle support subsystem 14 (Step 140).

Figure 4:
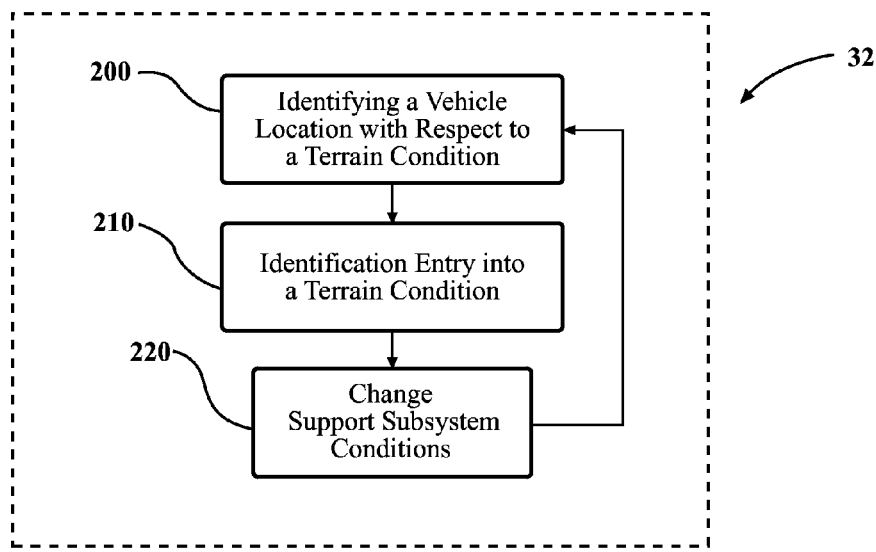
FIG. 4 is a schematic block diagram of an algorithm for operation of the auxiliary system according to one non-limiting embodiment.
Figure 5:
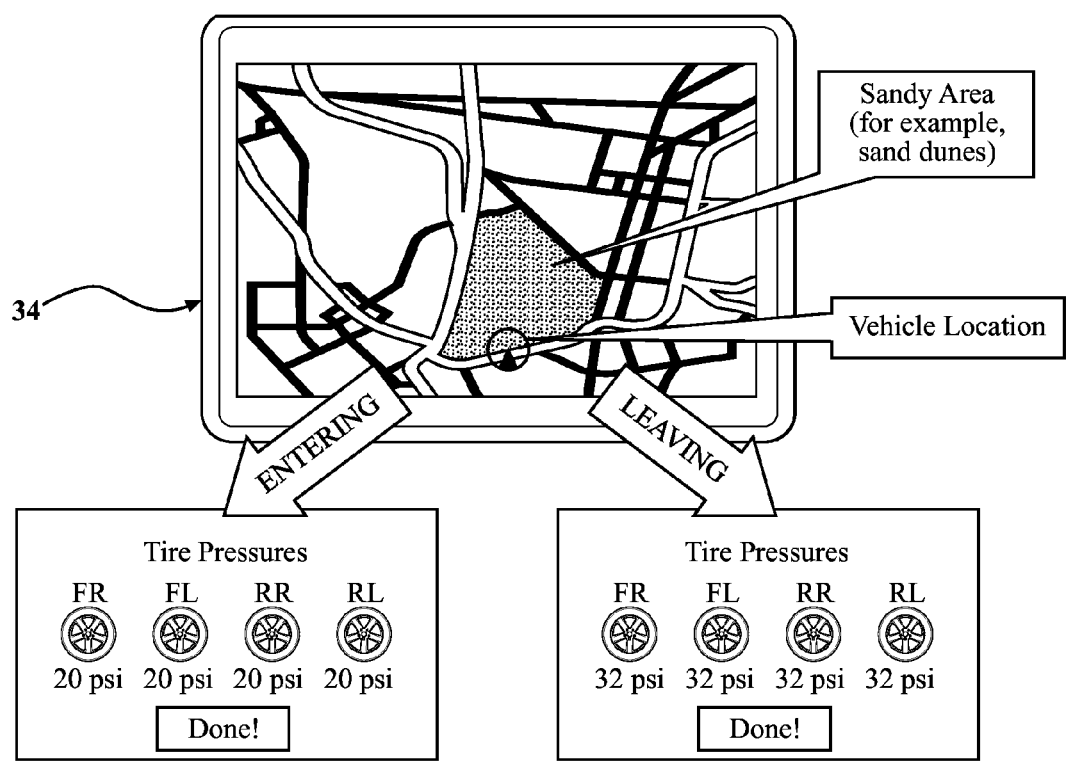
FIG. 5 is a series of pages displayed on a vehicle display in accordance with the schematic block diagram of FIG. 4.

With reference to FIGS. 4 and 5, operation of the auxiliary system 10 according to another disclosed non-limiting embodiment, generally includes identifying a vehicle location with respect to a terrain condition (step 200); identifies the entry or exit (Step 210) then automatically changes the condition of the vehicle support subsystem 14 (Step 220). Such automatic change in the vehicle support subsystem 14 may be particularly applicable to military, construction and farm type vehicles which may not have the regulatory restrictions of civilian passenger vehicles. The auxiliary system 10 may alternatively or additionally be combined with an audible and/or visual warning.

A system and method has been disclosed for control of vehicle characteristics based at least in part on terrain based on global positioning system (GPS) data, current weather information, and historical weather information.

It should be understood that relative positional terms such as "forward," "aft," "upper," "lower," "above," "below," and the like are with reference to the normal operational attitude of the vehicle and should not be considered otherwise limiting.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A system for a vehicle comprising:
   a GPS system;
   a tire inflation subsystem;
   a control system in combination with said GPS subsystem and said tire inflation subsystem;
   the control subsystem including a user interface;
   the control system, in response to a terrain change detected by the GPS subsystem, alerting the driver of a change in a condition of the tire inflation subsystem based on a terrain change;
   the control system changing or not changing the condition of the tire inflation subsystem in response to a driver input confirming or not confirming a change in the condition of the tire inflation system based on a terrain change; and
   the control system, by the user interface, advising the driver to stop the vehicle and enter another confirming input through the user interface that the vehicle has been stopped before beginning changing the condition of the tire inflation system.

2. The system as recited in claim 1, wherein the control system includes a display.

3. The system as recited in claim 1, wherein the control system includes a terrain database.

4. A method of operating a system for a vehicle comprising:
   identifying a vehicle location with respect to a terrain condition using a GPS subsystem;
   coupling a control system in communication with said GPS system and a vehicle tire inflation subsystem;
   providing said control subsystem with a user interface;
   alerting the driver, by the control system, in response to a terrain change detected by the GPS subsystem, of a change in the tire inflation subsystem based on a terrain change;
   changing or not changing by the control system of a condition of the tire inflation subsystem in response to a driver input through a user interface confirming or not confirming a change in the condition of the tire inflation subsystem based on a terrain change; and
   beginning changing the condition of the tire inflation system after the control system, through the user interface, advises the driver of the vehicle to stop the vehicle and to enter another confirming input through the user interface that the vehicle has been stopped before beginning changing the condition of the tire inflation system.

5. The method as recited in claim 4, wherein operating the vehicle support subsystem further includes adjusting a tire pressure.

* * * * *